March 27, 1945. K. MINDT 2,372,636
METAL BULLET-PROOF WINDOW
Filed Jan. 19, 1942
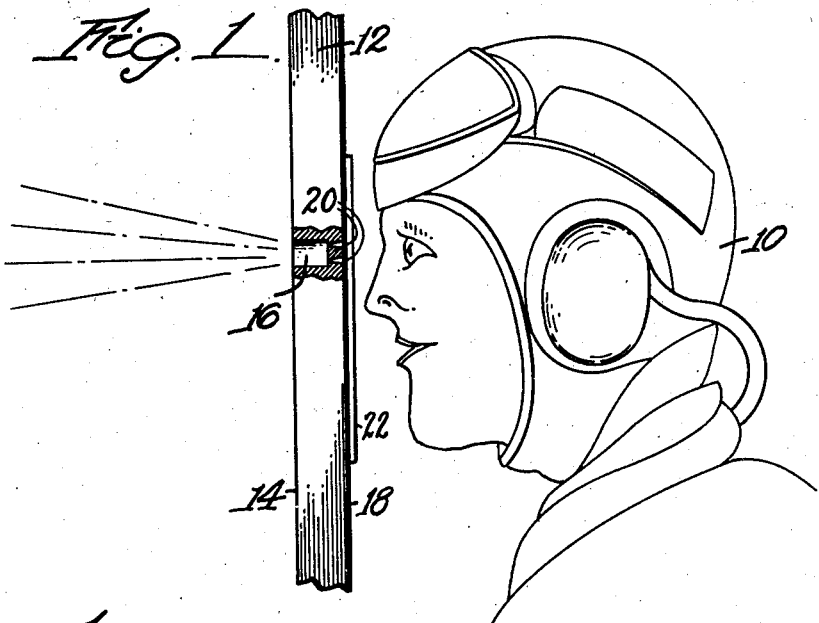
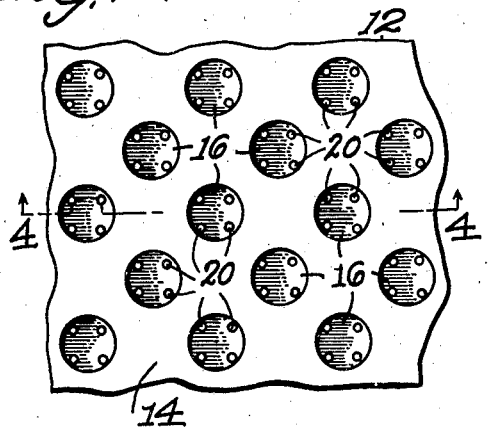
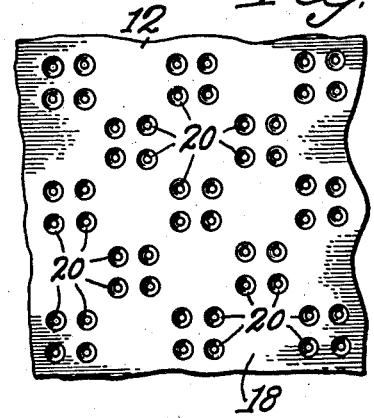
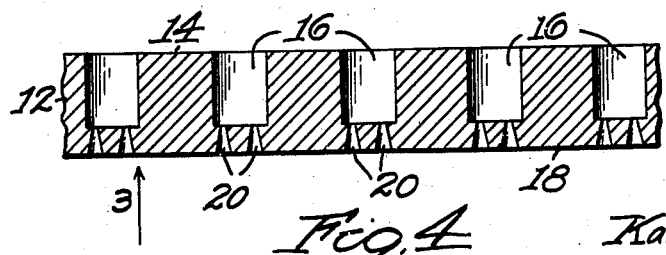
Inventor
Karl Mindt
by attorney
Charles R. Fay Patented Mar. 27, 1945

2,372,636

UNITED STATES PATENT OFFICE 2,372,636

METAL BULLETPROOF WINDOW

Karl Mindt, Fitchburg, Mass.

Application January 19, 1942, Serial No. 427,232

2 Claims. (Cl. 109—58.5)

This invention relates to a metal bullet-proof window for use in tanks, fortifications, aircraft, or in any relation where protection for observers or gunners is needed.

Objects of the invention include the provision of an armored metal plate of any size or configuration to suit the circumstances as desired, said plate being apertured in a particular manner to afford a maximum of vision therethrough, together with a maximum of safety to an operator from gun-fire; the provision of a metal bullet-proof window having an outer thickness or layer which is disposed toward the enemy or any dangerous person, this outer thickness being provided with a series of relatively large bores formed in a more or less regular order as desired, and which forms the main armor or bullet-stopping portion of the metal window, there being a thinner metal portion behind the outer thickness which is formed with a plurality of very small bores for each larger bore in the outer thickness, said small bores forming apertures for vision of the protected person; the provision of a metal bullet-proof window as aforesaid wherein the small bores are tapered to diverge in a direction away from the bottoms of the large bores towards the operator or protected person to enlarge the angle of vision while still maintaining the outward aspect of the small bores small enough to prevent possible entry of splattered metal from bullets which may strike into the large bores, said small bores being located adjacent the peripheries of the large bores so that a direct hit with a small caliber bullet cannot impinge upon any of the small bores.

Other objects and advantages of the invention will be hereinafter described and more particularly pointed out in the appended claims.

In the figures—

Fig. 1 illustrates a manner of use of my invention as a window;

Fig. 2 is a view in elevation of my invention as seen from the outward aspect thereof;

Fig. 3 is a view in elevation of my invention as seen from the reverse aspect from Fig. 1, this being the protected or viewing side of the window; and Fig. 4 is a section on line 4—4 of Fig. 2, the arrow 3 indicating the side of the window shown in Fig. 3.

In Fig. 1 there is shown an operator 10 using my window 12 as a viewing screen for the purpose of aiming a gun, driving a tank, piloting a plane, or for any use wherein vision is necessary from an enclosed or protectively armored location, such as on tank-destroyers, shielded gun emplacements, observation posts, teller's cages in banks, etc. The problem has always been to afford both protection and adequate vision to locations such as these, and heretofore the only practical solution has been to provide ports having swinging trapdoors. These trapdoors are objectionable because bullets can enter them and put the operator out of action when they are open, and of course no vision is possible while they are closed. This invention provides both protection and vision simultaneously wherever needed, and thus obviates the deficiencies of the prior art.

The window 12 may be of any thickness desired and the proportions of the bores may be varied to any degree within the limits of the invention, but the device as illustrated in Figs. 2 to 4 approximately corresponds to proportions worked out as satisfactory for most purposes, and windows made according to the present showing have been found to absolutely preclude any penetration of bullets either by direct hit or by splattering of the bullet material.

The outward aspect of the window as seen in Fig. 2 is presented to the enemy and is formed as armor plate having a surface 14 which is bored normal to the general plane of the plate at spaced intervals, substantially as shown, resulting in a plurality of bores or holes 16 which extend partially through the plate and somewhat past the central plane thereof. Bores 16 are preferably about 3/8 of an inch in diameter and are cylindrical so they will prevent the entrance of any .38 caliber bullet or over even when the axis of the bullet coincides with the axis of the bore, which is of course, an almost impossible circumstance. If the axes of the bullet and bore do not coincide, no bullet can enter directly, but will strike the edge of the bore or a side wall thereof and become spent prior to any splatter at the bottom of the bore. However, in actual practice, it has been found that there is almost no splattering reaching the bottom of the bore, and then usually only on direct entrance of a low caliber bullet.

After the bores 16 have been formed to a depth similar to that shown, the plate is bored from the inner surface 18 to produce a plurality of small tapered apertures 20, the smaller ends of these apertures being located at the bottoms of the bores 16. All of the apertures 20 are arranged to lie adjacent the peripheries of bores 16 as is clearly shown in Figs. 2 and 4, and the holes formed by the junctions of apertures 20 and the bottoms of holes 16 are so small as to preclude the entrance of even splattering lead, while the thickness of the plate at the location of apertures 20 is sufficient to easily stop bullets of low caliber even if the latter make direct hits, which, as explained above, is almost an impossibility. Even under direct hits, the absence of central apertures provides against the full force of any bullet being expended at the apertures. That is, by placing the latter at the peripheries of bores 16, the apertures 20 cannot be directly impinged upon by any bullet, and therefore no lead can penetrate into the apertures.

By reason of the tapering of apertures 20, a wider angle of vision is provided through them, and at 100 yards range, a circle of about 100 feet diameter can be seen through a single aperture. Also, the observer is enabled to look through more than one aperture at a time, and if one should become clogged, an extremely small inclination of the head brings another aperture into line with the desired range of vision. If the observer stands backs from the window, the outline of objects very close up to it will be seen through a plurality of apertures at once.

The thickness of the window at the area of bores 16 provides the main armor, and the plate is thick enough to stop all bullets, while the thickness of the portion of the plate at apertures 20 is sufficient to stop all small caliber bullets. The window may be of any shape to suit conditions and be curved or bent to fit tanks, armored cars, etc., where needed.

My invention also contemplates the use of a shatter-proof translucent or transparent glass-like sheet or shield 22 which may be used if convenient behind the metal window as shown in Fig. 1. In this case, the apertures 20 may be enlarged for greater vision, as any possible splatter through such enlarged apertures will be stopped easily by the shatter-proof sheet.

I claim:

1. A metal bullet-proof window comprising a plate having at one side thereof a series of flat bottom bores extending part-way therethrough, the remainder of the plate in the area of the bottoms of the bores having a plurality of tapered apertures extending from the bottom of each bore through the remainder of the plate, each aperture having its smaller end located in the bottom of its bore adjacent a wall thereof and its wider end located in a surface of the plate, said apertures forming viewing means for an observer located at said surface.

2. A bullet-proof window comprising a metal plate having a relatively large bore part-way therethrough, the remainder of the plate having a relatively smaller aperture extending from the bottom of the bore through the remainder of the plate, and a substantially solid sheet of translucent material on at least one side of the plate, said sheet lying directly on the plate and covering its extent.

KARL MINDT.